(12) United States Patent
Dangerfield (10) Patent No.: US 9,141,140 B2
(45) Date of Patent: Sep. 22, 2015

(54) BUTTON SHAPED PORTABLE MEDIA PLAYER WITH INDICIA

(71) Applicant: Parte LLC, New York, NY (US)

(72) Inventor: Nicholas E. Dangerfield, New York, NY (US)

(73) Assignee: PLAYBUTTON, LLC, New York, NY (US)

( * ) Notice: Subject to any disclaimer, the term of this patent is extended or adjusted under 35 U.S.C. 154(b) by 412 days.

(21) Appl. No.: 13/655,981

(22) Filed: Oct. 19, 2012

(65) Prior Publication Data

US 2013/0103171 A1  Apr. 25, 2013

Related U.S. Application Data

(60) Provisional application No. 61/549,020, filed on Oct. 19, 2011.

(51) Int. Cl.
| | |
|---|---|
| *G06F 17/00* | (2006.01) |
| *G06F 1/16* | (2006.01) |
| *A44B 1/00* | (2006.01) |
| *A44C 3/00* | (2006.01) |

(52) U.S. Cl.
CPC ............... *G06F 1/163* (2013.01); *G06F 17/00* (2013.01); *A44B 1/00* (2013.01); *A44C 3/001* (2013.01)

(58) Field of Classification Search
CPC .............. G11B 2220/61; G11B 2020/00057; G11B 2220/17; G06F 1/1656; G06F 1/163; G06F 17/30017; A45F 2200/0508; H04M 1/0283
See application file for complete search history.

(56) References Cited

U.S. PATENT DOCUMENTS

| | | |
|---|---|---|
| 6,423,892 B1 | 7/2002 | Ramaswamy |
| 7,559,089 B2 | 7/2009 | Kroll et al. |
| 7,562,394 B2 | 7/2009 | Kroll et al. |

(Continued)

FOREIGN PATENT DOCUMENTS

| | | |
|---|---|---|
| FR | 2 896 611 | 7/2007 |
| KR | 10-0637597 | 10/2006 |

(Continued)

OTHER PUBLICATIONS

Anonymous: "Compact COOLMAN music badge for endless music : Designbuzz : Design ideas and concepts", Jun. 6, 2008, XP055086613, Retrieved from the Internet: URL:http://www.designbuzz.com/compact-coolman-music-badge-for-endless-music/ [retrieved on Nov. 4, 2013] p. 1-p. 1.

(Continued)

*Primary Examiner* — Andrew C Flanders
(74) *Attorney, Agent, or Firm* — Leason Ellis LLP (57) ABSTRACT

A portable media player has the form of a wearable button and includes a body and a means for detachably attaching the body to an article of clothing, such as a shirt or jacket. The media player also includes electronics disposed with a base. The electronics include a processor including memory that contains at least one audio file and the player further includes controls to permit powering of the player and playing of the audio file stored in memory. The controls are operatively connected to the electronics. A cover of the body includes a first fastening member and the base of the body includes a second fastening member. The cover and base are detachably connected to one another, thereby allowing a user to remove and change the cover of the body so to alter an appearance of the media player.

20 Claims, 9 Drawing Sheets

(56) References Cited

U.S. PATENT DOCUMENTS

| | | |
|---|---|---|
| 7,882,563 B2 | 2/2011 | Kroll et al. |
| 7,900,009 B2 | 3/2011 | Levy |
| 2002/0034302 A1 | 3/2002 | Moriai et al. |
| 2002/0077988 A1 | 6/2002 | Sasaki et al. |
| 2004/0059927 A1 | 3/2004 | Chen |
| 2004/0263494 A1* | 12/2004 | Poor et al. .................... 345/204 |
| 2006/0020890 A1 | 1/2006 | Kroll et al. |
| 2006/0020901 A1* | 1/2006 | Kroll et al. .................... 715/772 |
| 2006/0020968 A1 | 1/2006 | Kroll et al. |
| 2006/0076375 A1 | 4/2006 | Bhakta |
| 2006/0088699 A1 | 4/2006 | Yeh |
| 2006/0276920 A1 | 12/2006 | Leung |
| 2007/0058819 A1 | 3/2007 | Hertz et al. |
| 2007/0099681 A1 | 5/2007 | Kielland |
| 2007/0282972 A1 | 12/2007 | Kroll et al. |
| 2007/0298840 A1 | 12/2007 | Squires |
| 2008/0065246 A1 | 3/2008 | Zorkendorfer et al. |
| 2008/0137269 A1 | 6/2008 | Bak et al. |
| 2009/0030538 A1 | 1/2009 | Levy |

FOREIGN PATENT DOCUMENTS

| | | |
|---|---|---|
| KR | 10-2007-0000045 | 1/2007 |
| WO | WO 2011-115734 | 9/2011 |

OTHER PUBLICATIONS

Josh Rubin: 11 Playbutton—Cool Hunting, Oct. 18, 2010, XP055086534, Retrieved from the Internet: URL:http://www.coolhunting.com/tech/playbutton.php [retrieved on Nov. 4, 2013] the whole document.

"Our Products." Findaway World—Our Products. Findway World, n.d. Web. Sep. 6, 2011. <http://www.findawayworld.com/what-we-do/our-products/>.

\* cited by examiner

Fig. 13

BUTTON SHAPED PORTABLE MEDIA PLAYER WITH INDICIA

CROSS REFERENCE TO RELATED APPLICATIONS

The present application claims priority to U.S. patent application Ser. No. 61/549,020, filed Oct. 19, 2011, which is hereby incorporated by reference in its entirety.

TECHNICAL FIELD

The present invention relates to portable media players and in particular, to a portable media player that has a button shape and includes indicia that directly relates to content stored in the media player.

BACKGROUND

Over the years, portable audio or media players have become increasingly more popular and are some of the more commonly owned electronic consumer products. Portable players are used in any number of different settings. For example, many people use portable players while exercising, e.g., outdoors or in the gym, and many use the players while commuting or walking between locations.

Generally, a portable audio player is a personal mobile device that allows the user to listen to recorded audio while mobile. A personal player refers to a portable audio player that is listened to with headphones. Many times, these players also can receive broadcast radio signals, such as AM and FM signals.

One of the first portable players that enjoyed widespread success was a compact cassette player, such as the Sony Walkman introduced in 1979. As technology advanced, different types of portable players became popular and mainstream. For example, compact disc players that played commercial CDs enjoyed success and the later models were able to play recordable CDR and CDRW media. The next breakthrough in technology resulted in digital audio players becoming available. The players were based on flash memory or hard disk storage. Files were usually compressed using lossy compression; this reduces file size at the cost of some loss of quality. The advantage of solid-state digital audio players over hard disks and CDs is resistance to vibration, small size and weight, and low battery usage.

Digital audio players are designed so that a user can download content into the memory of the player. The audio content of the player is therefore dynamic and can be easily changed by the user by simply deleting files that the user is no longer interested in and/or downloading new files. The player typically includes a display screen, such as an LED screen, which displays certain information, such as the track number, the name and/or selection being played, radio station, etc.

These type of players are thus of a type that the consumer has access rights and where the content storage is dynamic and can be changed by the end user. The players can be worn on the body by using a strap, belt or the like.

Nonprogrammable (closed) players can also come in different forms, such as an electronic greeting card. The card will typically play a song, such as Happy Birthday, when the consumer opens the card. The card has a micro speaker, a coil cell and simple leaf switch that opens and closes the circuit based on the opening and closing of the greeting card itself. However, this type of device is not intended to be worn and function as a media player for the listening pleasure of an end user.

SUMMARY

In one embodiment of the present invention, a portable media player has the form of a wearable button and includes a body that has a front face and a rear face. The media player also has a means for detachably attaching the body to an article of clothing, such as a shirt or jacket. The media player also includes electronics disposed with the base. The electronics include a processor including memory that contains at least one audio file and the player further includes controls to permit powering of the player and playing of the audio file stored in memory and permit the play of the audio file to be stopped. The controls are operatively connected to the electronics. The cover of the body includes a first fastening member and the base of the body includes a second fastening member. The cover and base are detachably connected to one another, thereby allowing a user to remove and change the cover of the body so to alter an appearance of the media player. The processor executes software to provide the functionality described herein.

These and other aspects, features and advantages shall be apparent from the accompanying Drawings and description of certain embodiments of the invention.

DETAILED DESCRIPTION OF CERTAIN EMBODIMENTS OF THE INVENTION

In accordance with a first embodiment of the present invention, a portable media player 100 is illustrated in FIGS. 1-8. The portable media player 100 is in the form of a wearable button and includes a button body 110 having a front face or surface 120 and an opposite rear face or surface 130. The button body 110 has a peripheral side wall 140 that extends between the front and rear surfaces 120, 130.

Figure 1:
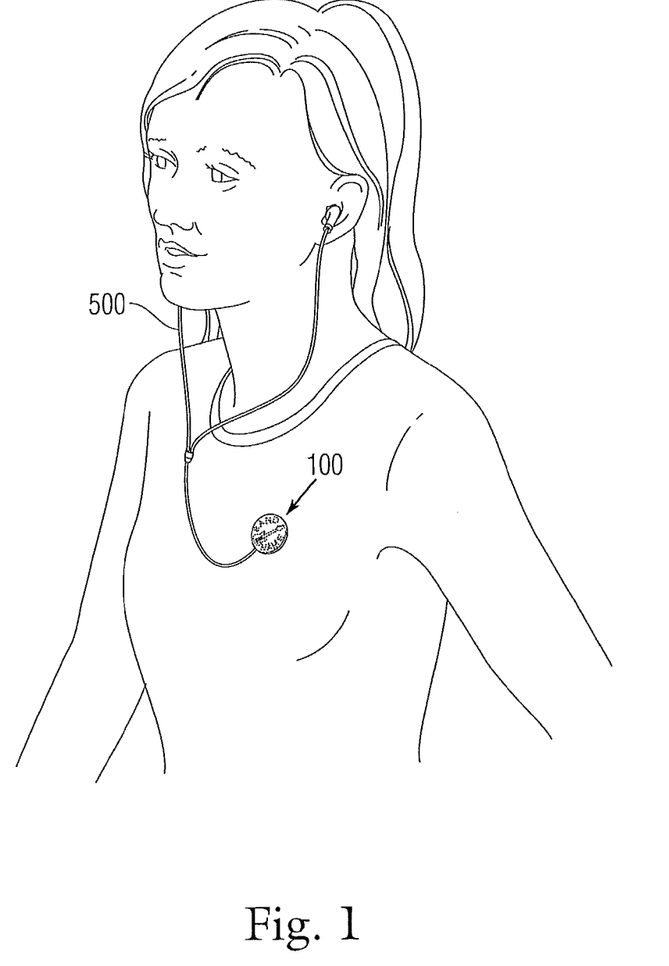
FIG. 1 is a perspective view of a button shaped portable media player with indicia according to one exemplary embodiment of the present invention.

While in the illustrated embodiment, the body 110 has a circular shape, it will be understood that the body 110 can have other shape, such as a shape selected from the group consisting of a square, a rectangle, a triangle, and an oval.

The button shaped media player 100 is intended to be worn on a body of a user similar to how a conventional button is worn. More specifically, the player 10,0 includes a means 200 to allow the player 100 to be worn on the user's body. The means 200 can be any number of different types of conventional coupling techniques (mechanical fastening) to detachably attach the player 100. The embodiment shown in FIGS. 1-4 uses a pinback structure 200 as the means for attaching the button body 110 to an article of clothing worn by the user. The pinback structure 200 is disposed along the rear surface 130 and includes a depressable pin 210 that engages and locks with a pin clasp 220 to securely attach the button body 110 to the clothing. In an unlocked position, the pin 210 is free of the pin clasp 220 and this allows the pin 210 to be inserted through the article of clothing and then engaged with the pin clasp 220 to securely attach the button.

It will be appreciated that a pinback structure is only one type of structure for attaching a button to clothing. Other clasp or clamp or other structures are equally possible for removably attaching the button player 100 to the article of clothing.

Figure 2:
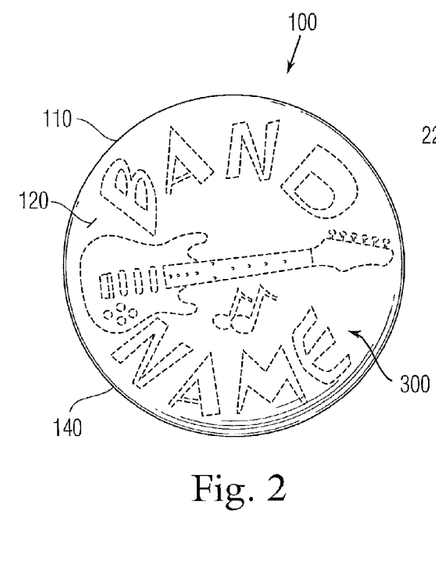
FIG. 2 is front elevation view of the player of FIG. 1.

In accordance with the present invention, the front face 120 includes indicia 300 that corresponds to the content that is stored in memory. In other words, the indicia 300 is artist indicia that is representative of the song(s) stored in memory. For example, the indicia 300 can be a graphic representation of at least one or more of the following: the name of the artist, the song title, an album cover, or other indicia that is representative of the content stored in memory.

In one embodiment, only a single song is stored in memory of the player 100 and the indicia 300 lists the artist name and/or song title and/or contains a graphical image that is representative thereof.

It will be appreciated that the indicia 300 on the front face 120 is thus fixed (static) just as is the stored content in memory is fixed and cannot be changed by the end user.

As a result and in accordance with one embodiment of the present invention, the indicia 300 can be in the form of a lenticular image that is disposed across the surface of the front of the player.

The players of the present invention have widespread use and can be provided to consumers (end users) through a wide array of different channels. For example, the player 100 can therefore serve as a promotional item for promoting an artist's song or a selection of songs by an artist. The player 100 can also be used to promote an event or venue as well as well as be used at a charity or similar event. The recipient or consumer can simply attach the player 100 to the article of clothing and then actuate the player to allow listening of the content thereof.

The size of the player 100 can vary depending upon the application; however, the player 100 should be of a size that can be comfortable worn on the user's article of clothing and due to the relatively simply electronics, described below, that are contained within the player 100, the player 100 can have a relatively small size, such as a size slightly bigger than a quarter. However, it can have a larger size if more space is needed to place the desired indicia 300 on the front face 120.

Since there is no dynamic display, the indicia 300 is limited to representing the content stored in memory and the content cannot be manipulated in any manner. The user can only simply play the media and stop the playing of the media at any point in time. In other words, the consumer has no access right (since there are no data ports or the like) and instead, the memory is factory programmed. In one embodiment, the memory can be of a WORM type (write once, read many), which refers to data storage media that can be written to once, but read multiple times. It will be appreciated that other types of memory can be used so long as the end user does not have access rights to the memory and thus cannot alter the content of the memory.

In one embodiment, the memory storage is large enough to be able to contain a CD quality type of audio (e.g., 700 MB or more).

Figure 4:
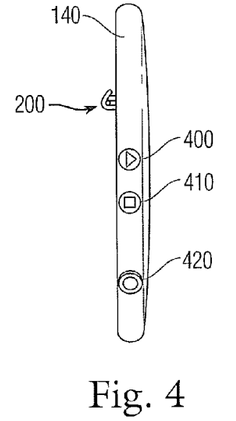
FIG. 4 is a side elevation view of the player of FIG. 1.

As a result, since the player 100 is a closed media player in that there is no consumer access right, the player 100 includes only limited playback controls. For example, the player 100 can include a first button 400 (play button) and a second button 410 (stop button). The first and second buttons 400, 410 are disposed along the peripheral side wall 140 of the body 110.

To play the content, the user simply presses the first button 400 and to stop the play, the user simply presses the second button 410. The electronics of the player 400 can be configured so that the player 400 is powered on by pressing the play button 400 and to power off, the user can hold down the stop button 410 for a prescribed period of time (as opposed to merely pressing the stop button once to stop play).

In terms of playback volume, the player 100 can be designed so that there is only one preselected playback volume and thus, there is no need for any volume controls. Alternatively, the playback controls can include volume control buttons (+ and − buttons) that can be located along the peripheral side wall 140. For ease of illustration, the present figures show the first embodiment where the volume is set at a prescribed setting and cannot be changed by the user.

To allow listening of the content through headphones 500, the player 100 includes a headphone jack 420 (audio port) that is disposed within the body 110 of the player 100. The jack 420 is thus open along the peripheral side wall 140 of the body 110 and is configured to receive a plug of the headphones 500. The headphones 500 are conventional headphones that are configured to be worn with portable media players. The jack 420 can also receive a plug that is connected to one or more speakers to permit listening of the content by means of the speakers.

Figure 5:
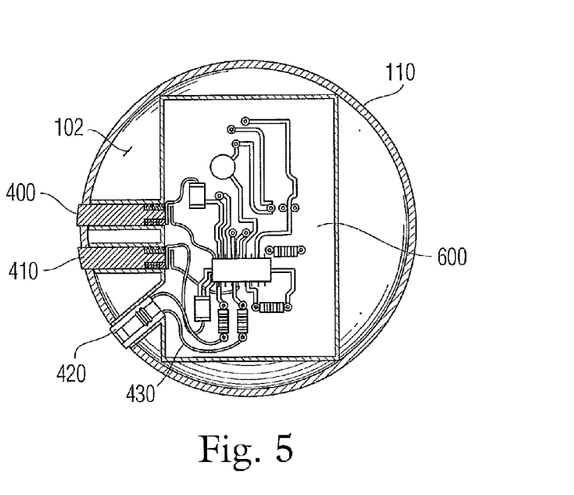
FIG. 5 is a cross-sectional view of the player of FIG. 1.

FIG. 5 is a cross-sectional view of the player 100 taken through the body 110 to illustrate the inner components of the player 100. For example, the player 100 includes an inner compartment or cavity 102 that contains electronics that allow storage and controlled play of media content (e.g., a song or selection of songs that is saved as compressed audio files).

The player 100 is similar to most MP3 players and includes a memory storage device (e.g., flash memory or a miniature hard disk drive), an embedded processor, and a microchip (audio codec chip) to cover the compressed audio file into an analogue sound signal.

The electronics thus generally include a processor 600 (microchip) that has memory (e.g., internal flash memory (solid-state memory)) for storing the media and is electrically connected to the first and second buttons 400, 410 and the jack 420. For example, electrical leads or contacts 430 connect the buttons 400, 410 and the jack 420 to the processor 600 to allow the limited control of the player as described herein. A power source (not shown) is likewise included within the inner compartment 102. The power source is electrically connected to the processor 600 and can be in the form of one or more batteries (e.g., rechargeable batteries or non-rechargeable batteries).

The processor executes software to provide the functionality described herein.

It will be appreciated that other conventional components found in media players can be included as part of the electronics. For simplicity, the processor 600 is understood to include conventional electronic components that process the stored media to allow for playback, e.g., a digital signal processor (DSP), amplifier, etc.

Once again, the player 100 is not an open, fully writable device and therefore it does not include a data port to allow content to be uploaded and/or downloaded externally from a device, such as a personal computer, to the memory. As described previously, the content stored in memory is static and at the time of manufacturing the chip (processor 600), the content is stored in memory to allow subsequent assembling and sealing of the player 100.

Figure 3:
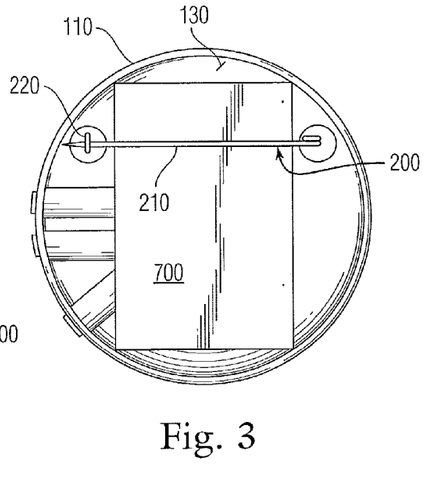
FIG. 3 is a rear elevation view of the player of FIG. 1.

As can be seen in FIG. 3, a cover 700 or the like can be included as part of the rear face 130 of the body 110. For example, the cover 700 can be located underneath the movable pin of the pinback structure 200. The cover 700 can be fastened to the body 110 using conventional means, such as a snap-fit.

Figure 6:
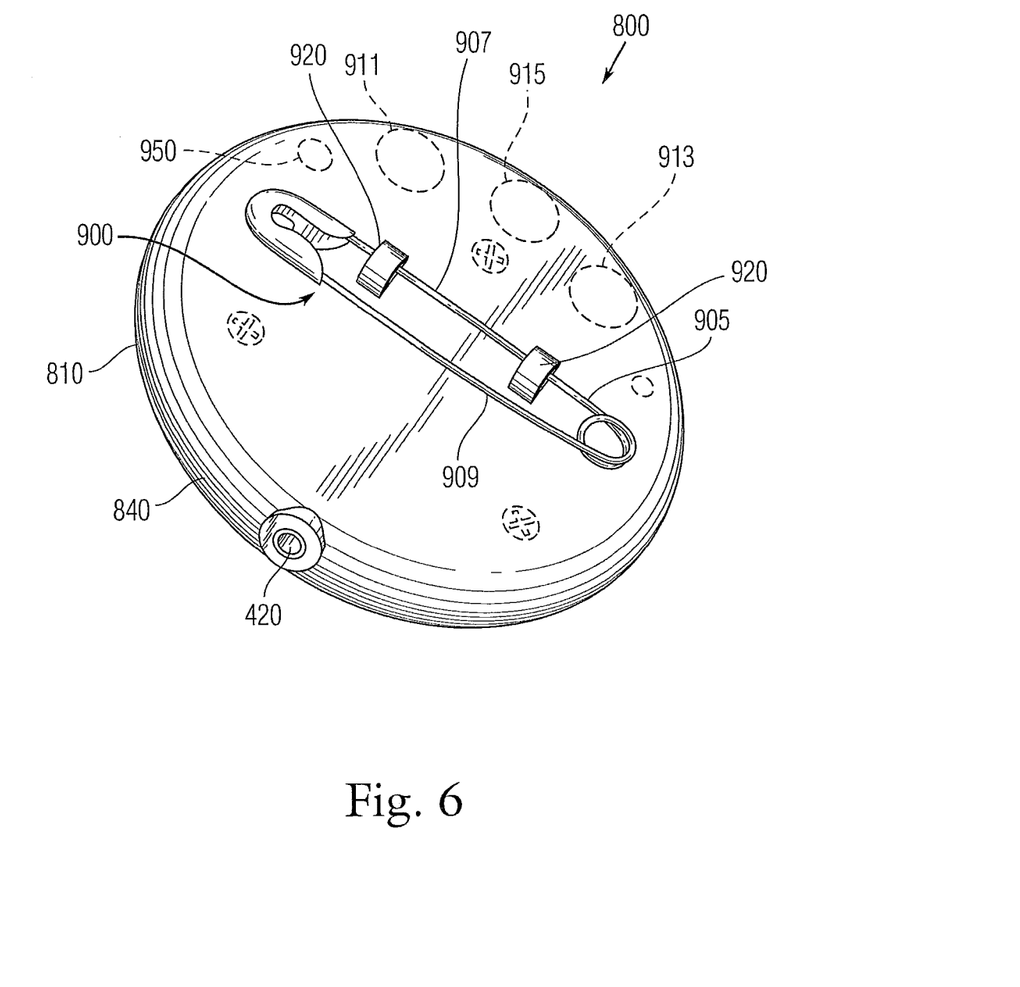
FIG. 6 is a rear and bottom perspective view of a button shaped portable media player with indicia according to another embodiment.
Figure 7:
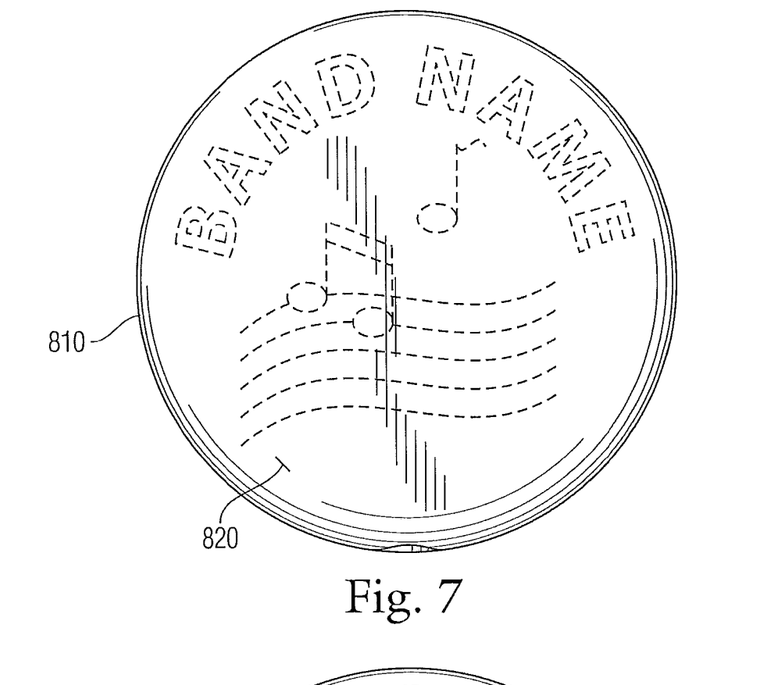
FIG. 7 is a front elevation view of the button shaped portable media player of FIG. 6.
Figure 8:
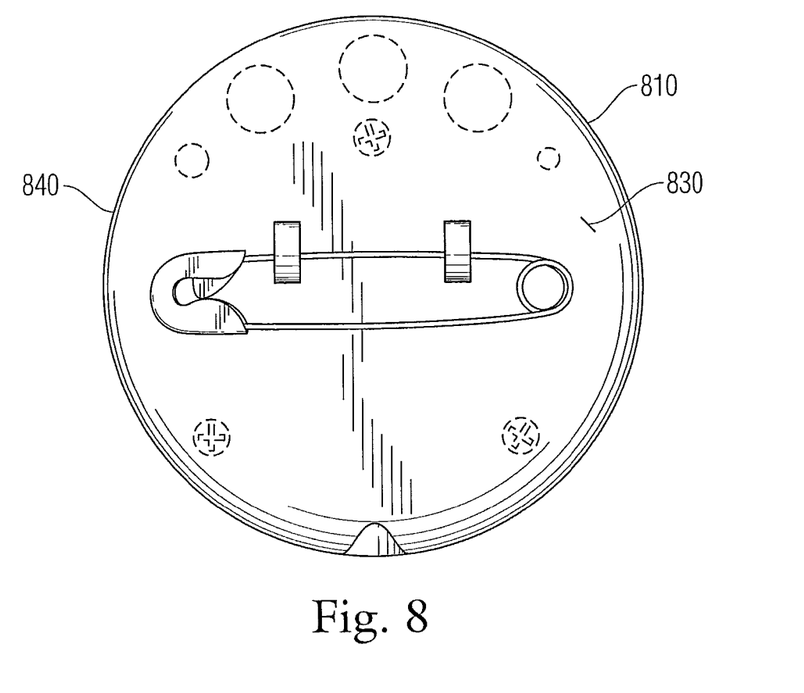
FIG. 8 is a rear elevation of the button shaped portable media player of FIG. 6.

Now referring to FIGS. 6-8, a portable media player 800 according to another embodiment is illustrated. The portable media player 800 is similar to the button 100 as will be appreciated by viewing the figures. As described herein, the portable media player 800 is intended to operate in a similar manner as the button 100. In other words, the portable media player 800 is in the form of a wearable button and includes a button body 810 having a front face or surface 820 and an opposite rear face or surface 830. The button body 810 has a peripheral side wall 840 that extends between the front and rear surfaces 820, 830.

While in the illustrated embodiment, the body 810 has a circular shape, it will be understood that the body 810 can have other shape, such as a shape selected from the group consisting of a square, a rectangle, a triangle, and an oval.

The button shaped media player 800 is intended to be worn on a body of a user similar to how a conventional button is worn. More specifically, the player 800 includes a means 900 to allow the player 800 to be worn on the user's body. The means 900 can be any number of different types of conventional coupling techniques (mechanical fastening) to detachably attach the player 800. The embodiment shown in FIGS. 6 and 8 uses a pin 905 as the means for attaching the button body 810 to an article of clothing worn by the user. The pin 905 can be any number of different types of pins including a safety pin as shown in the figures. Unlike the first embodiment, the pin 905 used in the player 900 of the second embodiment is actually a separate component and can be of a conventional safety pin construction.

One will appreciate that since the pin 905 can be a separate component relative to the other parts and relative to the portable media player 900, different types of pins 905 can be selected for use with a common media player 900 design. For example, the pins 905 can be provided in any number of different colors and can include different graphic patterns and can even come in different sizes. This allows the user to customize the player 900 according to his or his tastes since different versions of the media player can be offered to consumers (end users).

Any number of different techniques can be used to secure the pin 905 to the body 810. In the illustrated embodiment, a crimping technique is employed in which the pin 905 is inserted between a pair of crimpable members 920 that are spaced apart from one another. The members 920 can be in the form of crimpable prongs, protrusions or the like that are attached at one end to the body 810. The members 920 thus extend outwardly from the body 810 and have free ends that are not attached to the body 810. Also shown in the figures, the members 920 have curved shapes to provide a gap there underneath to permit reception of the pin 905. The members 920 can thus be formed during a die cutting process when the body 810 itself is formed.

The pin 905 is thus secured after the fabrication of the body 810 and the other components. To secure the pin 905 to the body 810, the pin 905 is inserted underneath the prongs 920 so that the fixed bar 907 (the pin part that does not pivot open) is located underneath the prongs 920. The prongs 920 are then crimped or otherwise bent so as to completely capture and secure the pin 905 in place. The flexible bar 909 of the pin 905 is thus free of containment by the prongs 920 and thus can pivot open to allow the pin 905 to be fastened to an article of clothing that is being worn by the user.

The portable media player 900 also includes a number of other features that are not disclosed with respect to the media player 100.

For example, one such optional feature is an "instant play" feature in which the electronics (processor) of the player 900 can be configured such that once a plug is received into the jack 420, the player 900 is automatically powered on and starts playing content. This auto or instant play feature eliminates the need for the user to press a "play" button in a control panel to power up the unit. Since the portable media player is intended to be a "playbutton" in that it includes fixed content as described herein, the player 900 can have very basic controls, such a volume up and down, rewind and fast forward. Of course, if the user does not want to listen to the content right after inserting the plug into the jack 420, the user can simply press the stop button. It will also be appreciated that the processor of the present invention can be configured to provide an "instant off" feature in which the player 900 is turned off when the plug (connector) is removed from the jack 420.

It will also be appreciated that the jack 420 of the body 810 not only allows headphones 500 to be used but also allows a connector cable or the like (not shown) to be used to permit other functions, such as connecting to a USB port of a computer for charging of the batteries, connecting to speakers, etc.

As with the first embodiment, the media player 900 includes a number of control buttons, including a rewind (skip back) button 911, a fast forward (skip forward) 913 and a play/stop (pause) button 915. A reset button 919 can also be provided.

The media player 900 can also optionally include an equalizer (EQ) which can be activated with a button 950. As is known, equalization is the process of adjusting the strength of certain frequencies within a signal. The circuit or equipment used to achieve equalization is called an equalizer. These devices strengthen (boost) or weaken (cut) the energy of specific frequency bands. Media players typically have equalizers that boost bass or treble frequencies. The user can simply press the EQ button 950 to activate the equalizer and the user can be provided with a plurality of set equalizer modes that can be accessed by simply pressing the button 950 to scroll through the available EQ options. When the user hears a mode that is pleasing to the ear, the user can simply stop pressing the button 950 and leave the unit on this setting. The processor can be configured such that the equalizer is shut off by holding the button 950 down for a set time and similarly, the equalizer can be turned on by pressing down the button 950.

To reduce the number of buttons that are used, the player 900 is constructed such that the volume and fast forward and rewind features share the same buttons and in particular and for example, the fast forward (skid ahead) button can serve as either the volume up or down button and similarly, the rewind (skip back) button can serve as the opposite volume up or down. To change the volume, the user simply holds one of these buttons down for a period of time, while to operate the fast forward or rewind functionality, the user simply presses the button quickly.

The stop button also functions as a pause button.

Yet another feature that can be provided is a diffused light feature in which a light, such as an LED, is present within the body 810 and when the player 800 is operated, the light turns on. The light (LED) can serve several different purposes, first it can simply alert the user that the unit is on. Secondly, the light can provide diffused light that can be purposely combined with the indicia on the front of the body 810 to provide a certain appearance to the unit. For example, the graphic indicia that is part of the front can include a section where backlighting provides a dramatic effect and in such case, the light is placed within the body 810 at such location. For example, the graphic indicia may include a body of water and in which case, the light, which can be a blue LED, can be positioned behind this portion of the indicia and therefore, the body of water can have a blue glow when the player is operated. Similarly, certain text can strategically have backlighting. For example, the light can be positioned so that it backlights the name of the band and/or the name of the album, etc. Of course, the light can be positioned and designed to simply provide diffuse lighting which backlights the entire or most of the graphic indicia.

It will therefore be appreciated that the front cover of the body 810 can be formed of a translucent or semi-translucent material to permit such light to emanate therethrough. Accordingly, while the back of the unit may be formed of metal, the front portion of the unit is preferably formed of plastic or the like to permit the desired lighting.

The present invention thus provides a portable media player (MP3) that has no end user access. In other words, the end consumer (end user) cannot access or alter the content that is provided on the media player. The portable media player of the present invention thus provides the end user the feeling that he or she is listening to a conventional LP or CD. In addition, since the front of the media player is designed to display indicia that relates to the content of the media player, the end user can make others aware of what he or she is listening to since the media player is prominently worn on an article of clothing of the end user and is therefore visible to others.

In one alternative embodiment, the jack 420 can be used by a content supplier (e.g., music company, etc.) to upload content to the player; however, as described below, the media player is sealed to the end user in that the end user has no ability to modify the stored content. In other words, the basic components of the media player can be manufactured and then supplied to a content provider with the memory being blank. The memory that is provided to the content supplier is thus of a WORM type (write once, read many). The content supplier then uploads content to the memory, as by accessing the memory through the jack 420; however, once the memory is written with the content, it cannot be altered in any way by the end user since the content supplier has written the memory once and therefore, the memory cannot be altered. In other words, the memory is capable of storing information just once (by action of the content supplier).

In this embodiment, once the content supplier uploads content to the portable media player, the content supplier can then package the media player for distribution to the end user using conventional distribution avenues. The content supplier is thus an intermediary actor in the entire manufacturing and distribution chain.

Figure 9:
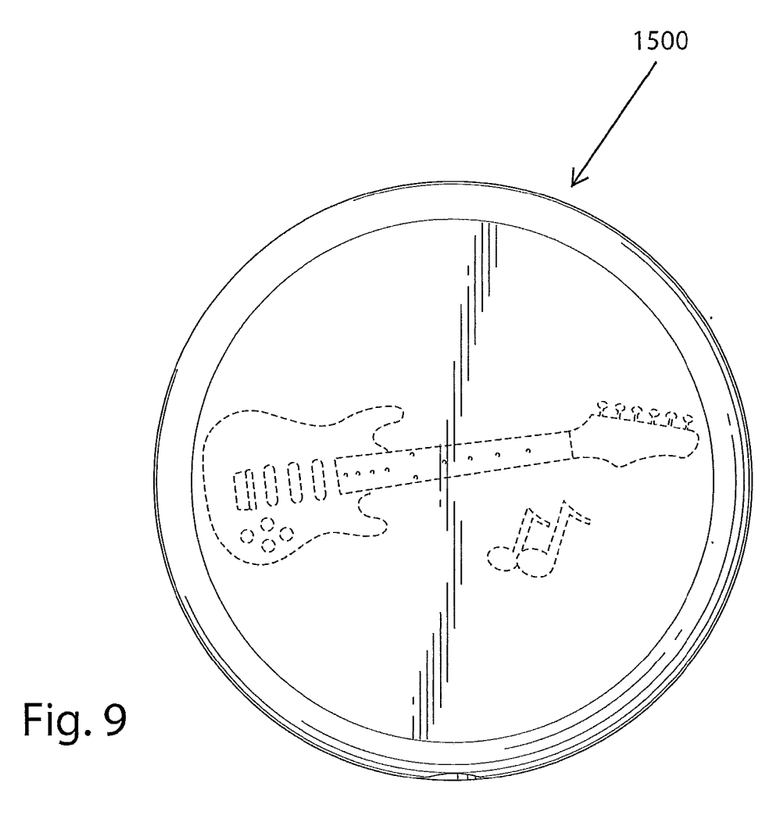
FIG. 9 is a front elevation of a button shaped portable media player according to another embodiment.
Figure 10:
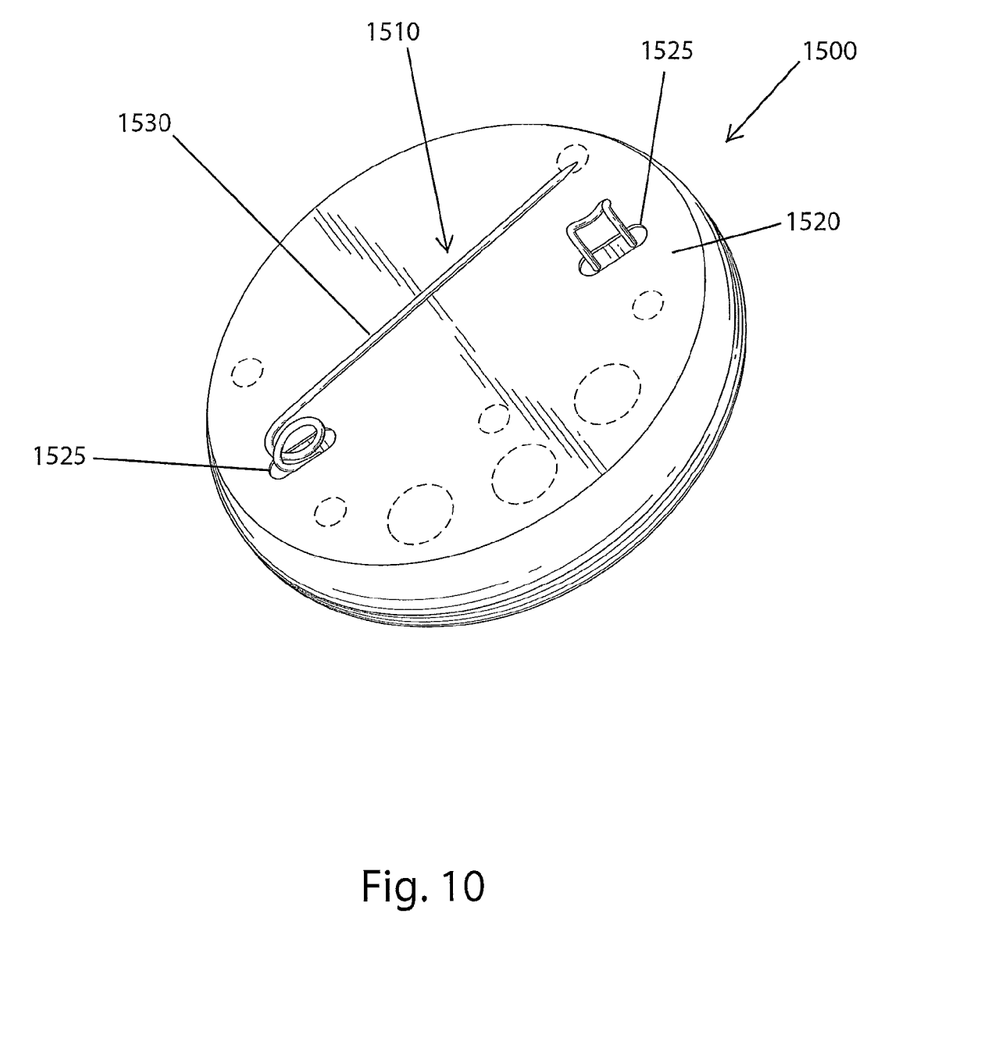
FIG. 10 is a rear perspective view of the player of FIG. 9.
Figure 11:
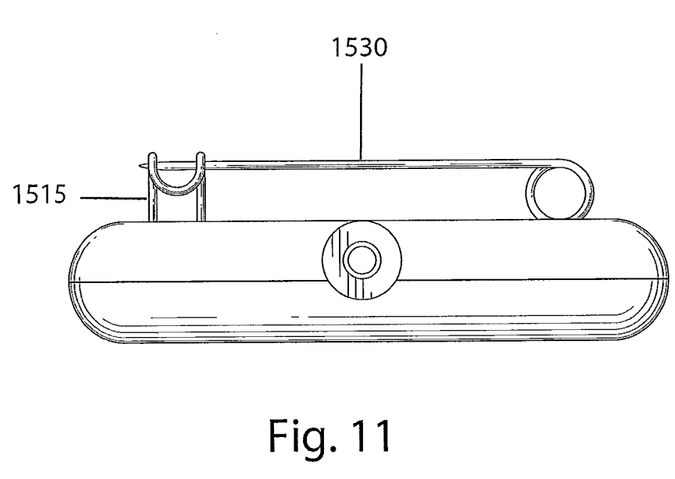
FIG. 11 is a side elevation view of the player of FIG. 9.

FIGS. 9-11 illustrate a media player 1500 according to another embodiment. The player 1500 is similar to the media player 100 except for the means for attaching the unit to the user. The attachment member is still in the form of a pinback or the like 1510; however, the relationship between the attachment member and the back unit. In particular, the base unit 1520 includes a plurality of spaced apart slots 1525 that form entrances into the hollow interior of the base unit 1520.

The pinback 1510 includes a first portion that terminates in a clasp member 1515 and a second portion in the form of a spring arm 1530 that includes a sharp end. When the second portion is pressed down towards the first portion and stores energy, the spring arm 1530 can be captured within the clasp member 1515, thereby allowing the button to be attached to the user's clothing, etc.

It will be appreciated that a pinback structure is only one type of structure for attaching a button to clothing. Other clasp or clamp or other structures are equally possible for removably attaching the button player 100 to the article of clothing.

In this embodiment, the first portion of the pinback 1500 (that is opposite the spring arm 1530) is not visible since it lies substantially below the surface of the base unit 1520.

Figure 12:
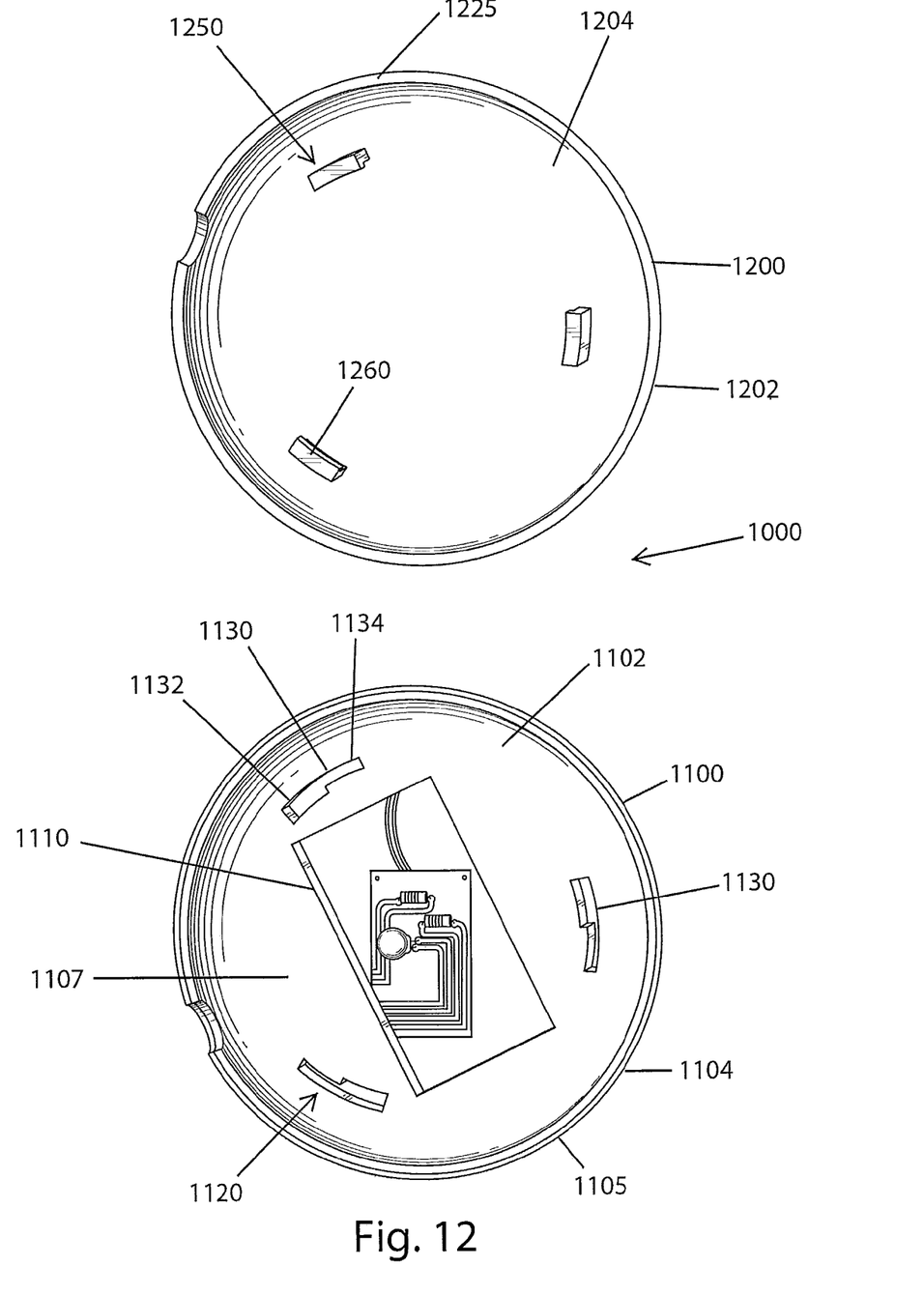
FIG. 12 is an exploded plan view of a portable media player of the type that has a cover that is removable relative to a base unit.

As shown in FIG. 12, a portable media player 1000 can be of a type that has a base unit 1100 and a removable cover 1200.

The base unit 1100 contains the operative parts of the player 1000 and in particular, the base unit 1100 includes the electronics, such as the controller, memory and user control interface (buttons) and headphone jack. These components operate in the manner described in hereinbefore with reference to earlier embodiments.

The shape and size of the player 1000 can vary and therefore, the player 1000 is not limited to having a circular shape and instead, it can be formed to have other shapes, such as a square, rectangle, triangle, oval, etc.

The base unit 1100 includes a front face 1102 and a rear face 1104 that faces the user when worn. The rear face 1104 includes a mean for attaching the player 1000 to the user, such as a clip, fastener, pin structure, etc. (as described hereinbefore) and control buttons, etc.

The front face 1102 can include a window or opening 1110 that permits the electronics to be visible and in some instances, to be freely accessible to the user. As shown, the window 1110 can be in the form of an opening. The front face 1102 also includes a first fastening member 1120 for securely attaching the cover 1200 to the base unit 1100. The cover 1200 is releasably yet securely attached to the base unit 1100 to permit easy removal and allow the user to freely vary and change the cover 1200 of the player 1000.

In the illustrated embodiment, the first fastening member 1120 is in the form of a plurality of locking slots 1130 that are formed in the first face 1102. Each locking slot 1130 has a first enlarged section 1132 and an adjacent second section 1134 that is smaller. The slots 1130 can be arcuate in nature and can be generally formed circumferentially about the window 1110. In other words and as shown, the window 1110 can be centrally located within the base unit 1100 and the slots 1130 are located between the central window 1110 and a peripheral edge of the base unit 1100.

The base unit 1100 in itself can be formed of several parts and formed of several materials. For example and as shown, the base unit 1100 can include a bottom part 1105 that defines the rear face and can be formed of a metal so as to define a robust housing for securely housing and protecting the electronics, etc. The bottom part 1105 thus represents a hollow shell or the like in which the electronics are contained. The base unit 1100 can also include a top part 1107 that covers a select area of the bottom part 1105. The top part 1107 thus represents a cover structure that is disposed over the hollow bottom part 1105 and is secured thereto. The top part 1107 is the structure in which the opening 1110 and the slots 1130 are formed and can thus be formed of a different material relative to the bottom part 1105 (such as a plastic material).

The top part 1107 is secured to the bottom part 1105 using conventional means including but not limited to a mechanical fit (e.g., use of fasteners, friction fit (snap-fit)), use of a bonding agent (adhesive), etc.

The first fastening member 1120 is thus a part of the top part 1107.

The cover 1200 includes a first face 1202 and a second face 1204. The first face 1202 faces outwardly and contains indicia, etc. as described above with respect to the other embodiments. In other words, the indicia can be in the form of an album cover graphic or band name, etc. or can includes a miscellaneous graphic (e.g., a printed pattern, etc.) that is not related to the media content stored in the memory. As a result and according to one aspect of the present invention, the cover 1200 of the Unit can be freely replaced by a person, which can be the end user, and this allows the look and feel of the device 1000 to be altered. It will also be understood that the shape of the covers 1200 can vary from one cover to the next in that a single base unit 1100 (e.g., circular shaped) can serve as the base to different shaped covers 1200. For example, the cover 1200 can be formed such that it seals against the base unit 1100 but the surface 1202 which represents the front of the device 1000 can have shape different that the base unit 1100. In one design, the cover 1200 can have a side wall that is complementary in shape to the side wall of the base unit 1100 since both side walls intimately contact one another so as to enclose the electronics, etc. (e.g., both side walls can be circular shaped); however, the remaining structure of the cover 1200 can alter in shape (e.g., be non-circular in shape). This allows, a non-circular shaped cover (e.g., a square cover) to be mated with a circular shaped base unit since the cover can have a circular shaped side wall and a non-circular shaped front portion.

The second face 1204 faces the base unit 1100 when the cover 1200 is attached to the base unit 1100.

The cover 1200 can be a concave structure (bowl-like) and includes a peripheral wall (side wall) 1225 or upwardly standing flange. The side wall 1225 has a first height.

Along the second face 1204, the cover 1200 includes a second fastening member 1250 for coupling the cover 1200 to the base unit 1100. The second fastening member 1250 is complementary to the first fastening member 1120 and is designed to produce a detachable coupling between the cover 1200 and the base unit 1100. The first and second fastening members 1120, 1250 can thus be any number of different types of mechanical fasteners and preferably, the fasteners are of a quick release type to allow the cover 1200 to be easily and quickly removed from the base unit 1100.

In the illustrated embodiment, the second fastening member 1250 comprises a plurality of locking catches 1260 (locking tabs). Each locking catch 1260 is in the form of an L-shaped catch that has a first upstanding wall that is attached to the second face 1204 and a second wall that extends from the upstanding wall and is generally parallel to the second face 1204. The catch 1260 can include a cam surface.

The locking catch 1260 is sized to be received within the first enlarged section 1132 and then be moved into the adjacent second section 1134 so as to lock the cover 1200 to the base unit 1100. In particular, the second wall is received within the first enlarged section 1132 and is moved to a position below the front face of the base unit 1100 and then as the cover 1200 is rotated, the upstanding wall of the locking catch 1260 moves into the adjacent second section 1134. In this rotated position, the second wall cannot pass through the second section 1134.

The locations of the catches 1260 and locking slots 1130 are registered so that the catches 1260 are all received within the sections 1132 initially and then rotate into the sections 1134 of the locking slots 1130, thereby producing a releasable lock.

To release and remove the cover 1200, the cover 1200 is rotated in an opposite direction until the second walls of the locking catches 1260 are in registration with the first enlarged sections 1132, thereby permitting removal of the cover 1200.

It will be appreciated that other techniques and means can be used to snap-fittingly attach the cover 1200 to the base unit 1100. Thus, the described attachment method is merely one way of releasably attaching the cover 1200 to the base 1100.

The media player 1000 can come in a kit or individual covers 1200 can be provided. The user can alter the appearance of the player 1000 by switching the covers 1200. When the content in the memory is fixed (i.e., an artist album collection), the different covers 1200 can be depict different album covers so to speak.

The user can also customize the appearance of the player 1000 by switching the cover 1200. Different graphic content can be displayed depending upon the mood of the user.

It will also be understood that while the player 1000 has been discussed herein as being of a closed type in that the end user cannot change the originally programmed material stored in the memory, this is only one embodiment. In other embodiments, the content stored in the memory can be changed by the end user. In other words, the memory can be a rewritable type to allow the end user the ability to upload and store content (e.g., music files) in the memory of the device. This can be accomplished by using an access port, such as a USB port or the like or can be done using the headphone jack.

In addition, the structure of the various covers 1200 can be different from one another. For example, one cover can include a window (e.g., physical opening or transparent window section) that permits a light source (LED) in the base unit 1100 to be visible. When the cover 1200 is attached, the window aligns with the light source. The playbutton can be fitted with LEDs behind the playbutton cover (face). As the playbutton cover (face) can be formed to be slightly translucent, the LED can retro-illuminate the playbutton so that it becomes visible even in dark conditions. This innovation is also to underline the concept of the playbutton as wearable pieces of music. This innovation is about illuminating a fashion accessory that we wear. The LEDs can be switched on and off by choice of the user using a control member, such as a button, switch, etc.

In addition, in some designs, the memory can be of a removable type and therefore, the removal of the cover 1200 provides access to the memory through the opening formed in the base unit. The user can thus remove the memory card and replace it with a different card by first removing the cover 1200 from the base unit 1100.

In yet another embodiment, the media player is constructed such that it includes software or hardware component that locks the content of the device once after it is uploaded for the first time. Upon locking the content, the memory can no longer be written over but can only be read and in the sense that no additional content (files) can be uploaded and stored in the memory. This mechanism can be configured in any number of different ways including having a lock mechanism based on an event, a time period, a storage quota, etc. For example, in the simplest of terms, the mechanism is configured to allow a single upload to occur. The user thus generates a single file to upload (which can be formed (be a compilation) of a number of individual songs, etc.). In other words, the upload can be a folder containing a number of different media files, such as individual song files. In yet another embodiment, the mechanism can be configured to allow the user to upload content for a predetermined period of time (e.g., for 1 hr after the device is turned on and set up for the first time) or the user can upload until a storage quota is reached. For example, the user can write files to memory; however, once a storage amount is reached (e.g., 98% of memory is full), then the user will not be allowed to upload additional content and the device is locked.

In yet another embodiment, the user can affirmatively select to lock the content. For example, a lock command can be part of a menu that can be accessed and navigated by the user. The user can thus scroll through the menu to reach the lock-out function and when the user desires to lock the device, the user can select this lockout command, thereby locking the content.

The purpose of this mechanism is to retain the experience of making a mixed tape for a friend. One can upload music, decide on the running order and then lock the device (i.e., lock the content by preventing any additional uploads and preventing a person from deleting content). The recipient of this gift then receives the player as a device the memory of which cannot be changed, so the track list chosen is there forever.

Thus, in one embodiment, the processor of the device is programmed to allow for such locking action. For example, in units that do not have a display screen, the locking action can be performed by holding down two separate buttons (e.g., volume down and the power button) for a predetermined amount of time. This locks the memory of the device. The processor is programmed such that once this occurs (first time the buttons are depressed together for a predetermined amount of time), the content is locked and the user can not add or delete content from the memory. The user thus directly controls the lockout process and as mentioned above, this type of device is intended for situations in which the device is ultimately intended for a third party and the purchaser (end consumer) has the ability to upload a unique playlist of songs and then lock the device so as to set the playlist in stone so to speak for the recipient of the device.

Once locked, a visual indicator can be activated, such as an LED, to alert the user that the lock command was received and that the device is now locked. This LED can be programmed to only illuminate for a set period of time after the locking has taken place. For example, the LED can blink three times to alert the user or the LED can stay illuminated until the unit is powered down the first time after locking the memory of the device.

In yet another embodiment, the player can be attached to a person's cloths by alternative means. For example, the playbutton (media player) can have a magnetic back, which will marketed coupled with t-shirts, shirts and jackets that will have certain areas of the fabric with an added magnetic layer. The playbutton can then be attached to the pieces of fabric in these particular areas of the clothing. With this innovation, the fashionable aspect of the playbutton is underlined, as concept of the playbutton is about wearing the music you listen to. So this innovation is not about a magnetic clip—the clothing will be the second magnetic element that is required to hold the playbutton in place. The clip/pin aspect of the playbutton can thus be substituted with the magnetic backing layer as a means for attaching the playbutton to a person's clothing. Alternatively, the magnetic backing can be used in combination with a pin type fastener that is illustrated in the other embodiments. In this scenario, the magnetic elements can be pads or the like that are disposed around the central pin.

In yet another embodiment, the playbutton (the present media player) can be configured in the form of a music player that will contain one 24 hour piece of music composed ad-hoc for the music player. This music player will be fitted with an internal clock (digital). The music will be synchronized with an internal clock of the device, whereby whenever the user switches on the player, the music playing will be that which corresponds to that particular time of the day. With this innovation, the user will not have the choice of selecting which part of the composition it wishes to play, as the music to be played will be governed by the internal clock. This will allow the composers to make music for the morning, afternoon, evening, night, etc. The interest for the user is that the music will only repeat when they switch it on at the same time. The clock can be visible to the outside through a screen or not, as this element is not critical for the purposes of the invention.

As a result, this embodiment presents a novel manner of combining and coordinating an internal clock with the content stored in memory within the player. The output of the player is thus directly tied to both the output of the internal clock (i.e., what time is it) and the recording schedule of the stored content in that the stored content includes a number of tracks that add up to 24 hrs of unique (non-repeating) music. Tracks are chosen for play at a specific time of day.

In accordance with this aspect of the invention, the programming of the music can be as follows. A 24 hr block of time (representing one day) is divided into one or more blocks of time that correspond to a particular time of the day. For example, a morning time block includes the hours of 6 AM to noon; an afternoon time block includes the hours of noon to 6 PM; an evening time block includes the hours of 6PM to midnight and an afterhours or overnight time period includes the hours of midnight to 6 AM. One or more genres of music can be selected for each time period (each block).

As mentioned above, the selection and scheduling of the tracks is done in view of the time of day in a 24 hr clock cycle in that music that occupies one time block can be selected in view of the person's interest and also in view of the general time of the day. For example, for a person that almost exclusively exercises between the hours of 7 PM and 10 PM, the player can be programmed to play up tempo selections that will get the adrenaline racing for the user. Conversely, from someone who enjoys meditation and yoga before bedtime or early in the morning, the selections can be programmed accordingly and the music can be selected to be calming, inspirational, etc.

A controller (processor) is designed to control the playback based on the time of day as measured by the internal clock (an input to the controller) and the schedule list of music (which is in a database which can contain the track number of length of play, etc.). The playbutton can be used with software that assists the user in programming the unit (e.g., uploading content) and can include one programming mode for the "24 hr clock operating mode". The software will assist the user in selecting, categorizing the music in the person's library according to different genres and also according to different play time periods in which the music will be played. Once the library is categorized, the music list can be generated and the software assists the user in filing the available blocks of time with the correct music. The software can thus manage the minutes of each time block and alert the user to how much time is left in a particular block and can make suggestions on how to fill the last remaining minutes of a block to optimize amount of time that is used for a particular block without having to partially cut off a song.

The removable cover of the present invention can also be formed to include a strategically placed section of enhance light transmission which is disposed in registration with a light source that can be disposed within the opening 1110 formed in the base unit 1100.

Figure 13:
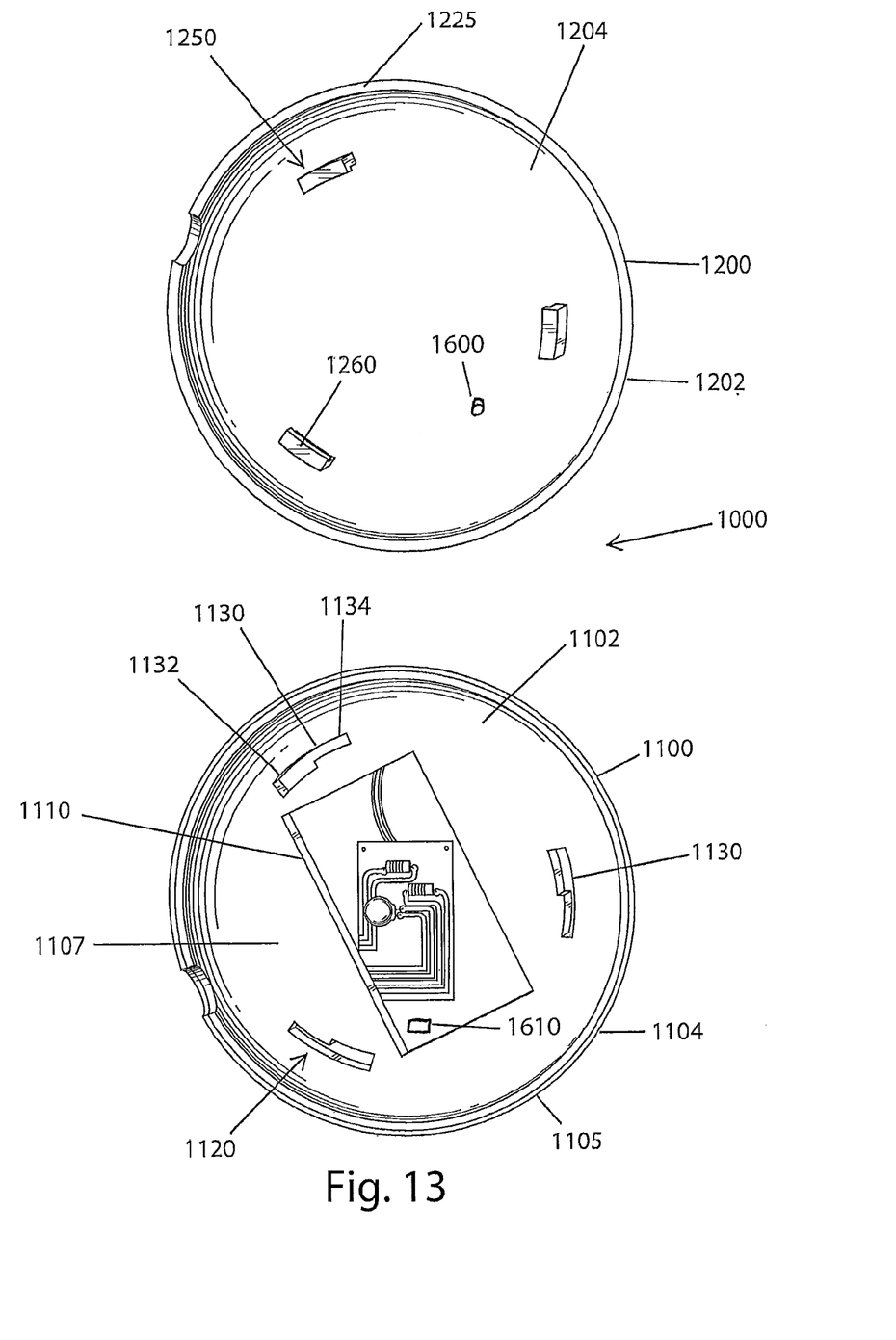
FIG. 13 is an exploded plan view of a portable media player of the type that has a cover that is removable relative to a base unit.

FIG. 13 shows a configuration in which the cover 1200 can include an actuator 1600, which can be in the form of a post (protrusion) which contacts a switch 1610 formed in the base 1100. The switch 1610 is accessible through the opening 1110 and the actuator 1600 is constructed such that when the actuator 1600 contacts the switch 1610, the LED (in the base) is illuminated when the player is powered on.

The opening 1110 can be formed such that when the cover 1200 is mated to the base 1100, the actuator 1600 is initially received in the opening 1110 and when the cover 1200 is moved to the locked position with respect to the base 1100, the opening 1110 is sized and shaped to accommodate such movement of the actuator 1600 (as the cover 1200 is moved to the locked position). Not all of the covers 1200 include the actuator and thus, the user can the ability to have a lighted media player by switching covers to one that has the actuator 1600 that causes the automatic illumination of the player 1100 due to the construction of the cover.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A media player comprising:
a body having a button shape, the body having a cover that defines a front face of the body and a base that defines a rear face of the body, the base being an at least partially hollow structure so as to define a hollow interior, wherein the base includes a top wall and an upstanding first peripheral wall that protrudes above the top wall which extends between the peripheral wall, wherein the cover includes a top wall and an upstanding second peripheral wall that protrudes below the top wall of the cover;
a means for detachably attaching the body to an article of clothing, the means being disposed along the base of the body;
electronics disposed within the hollow interior of the base below the top wall, the electronics including a processor and memory that contains at least one audio file; and
controls to permit powering of the player and playing of the audio file stored in memory and permit the play of the audio file to be stopped, the controls being operatively connected to the electronics;
wherein the cover of the body includes a first fastening member that is disposed along an underside of a top wall of the cover and the base of the body incudes a second fastening member that is formed along the top wall of the base, the cover and base being detachably connected to one another by engagement of the first and second fastening members which results in the first and second peripheral walls being disposed in an abutting relationship, thereby allowing a user to remove and change the cover of the body so to alter an appearance of the media player.

2. The media player of claim 1, further including artist indicia fixedly disposed on the front face, the indicia corresponding to the artist of the content stored in the audio file.

3. The media player of claim 1, wherein the top wall of the cover and the second peripheral wall are integral to one another and the top wall of the base and the first peripheral wall are integral to one another.

4. The media player of claim 1, wherein the means for detachably attaching the body to the article of clothing comprises a pinback structure.

5. The media player of claim 1, wherein the controls includes a play button that when actuated causes play of the audio file and a stop button that when actuated causes the audio file to stop playing.

6. The media player of claim 1, wherein the first and second fastening members form a releasable mechanical fit when mated together.

7. The media player of claim 6, wherein the first fastening member comprises a plurality of locking tabs that are spaced from the second peripheral wall and protrude downwardly from an underside of the top wall of the cover and are received with corresponding locking slots that are spaced from the first peripheral wall and protrude upwardly from the top wall of the base and represent the second fastening member, wherein the top walls are spaced apart when base and cover are mated together due to the first and second peripheral walls being in abutting relationship.

8. The media player of claim 7, wherein each locking tab and each slot is configured such that the locking tab can only be received into one section of the locking slot and upon rotation of the cover relative to the base, the locking tab assumes a second locked position within the slot.

9. The media player of claim 6, wherein the first and second fastening members form a snap-fit.

10. The media player of claim 1, wherein the top wall of the base includes an opening that is disposed over the electronics.

11. The media player of claim 1, wherein the body further includes a headphone jack to permit headphones to be worn to listen to the playback of the audio file, the headphone jack being formed in the base.

12. The media player of claim 1, wherein the processor and memory are configured to allow only a single upload of audio files to memory via an input formed within the base, whereafter, the memory is locked and additional uploads are prevented.

13. The media player of claim 12, wherein the controls are configured such that operation of one or more of the controls according to a prescribed manner causes the memory to be permanently locked.

14. The media player of claim 13, further including an indicator for indicating to the user that the memory has been successfully locked.

15. The media player of claim 14, wherein the indicator comprises an LED that is disposed within the base.

16. The media player of claim 1, wherein the electronics include an internal 24 hr clock for keeping track of a current time and wherein the processor is configured to include a 24 hr play mode, the memory containing one 24 hour piece of music which when played in its entirety consumes exactly 24 hours, whereby the music is synchronized with the internal clock of the device, whereby whenever the user switches on the player, the music playing will be that which corresponds to that particular time of the day.

17. The media player of claim 16, wherein the 24 hr piece of music is partitioned into different segments that correspond to discrete period of time within a 24 hr time block that starts and ends with midnight and is determined by the internal clock, and therefore, the user cannot change the sequence of the songs that make up the 24 hr piece of music and instead, the songs play at exactly the same time each day as measured by the internal clock.

18. The media player of claim 1, wherein the means for detachably attaching the body to an article of clothing comprises a pinback structure that includes a fixed bar and a pivotable bar that moves between open and closed positions, the fixed bar being substantially captured underneath the base.

19. A media player comprising:
- a body having a button shape, the body having a cover that defines a front face of the body and a base that defines a rear face of the body, the base being an at least partially hollow structure;
- an attachment member for detachably attaching the body to an article of clothing, the attachment member being disposed along the base of the body;
- electronics disposed within the base, the electronics including a processor and memory that contains at least one audio file; and
- controls to permit powering of the player and playing of the audio file stored in memory and permit the play of the audio file to be stopped, the controls being operatively connected to the electronics;
- wherein the electronics include an internal 24 hr clock for keeping track of a current time and wherein the processor is configured to include a 24 hr play mode, the memory containing one 24 hour piece of music which when played in its entirety consumes exactly 24 hours, whereby the music is synchronized with the internal clock of the device, whereby whenever the user switches on the player, the music playing will be that which corresponds to that particular time of the day.

20. The media player of claim 19, wherein the 24 hr piece of music is partitioned into different segments that correspond to discrete period of time within a 24 hr time block that starts and ends with midnight and is determined by the internal clock, and therefore, the user cannot change the sequence of the songs that make up the 24 hr piece of music and instead, the songs play at exactly the same time each day as measured by the internal clock.

* * * * *